Figure 1:
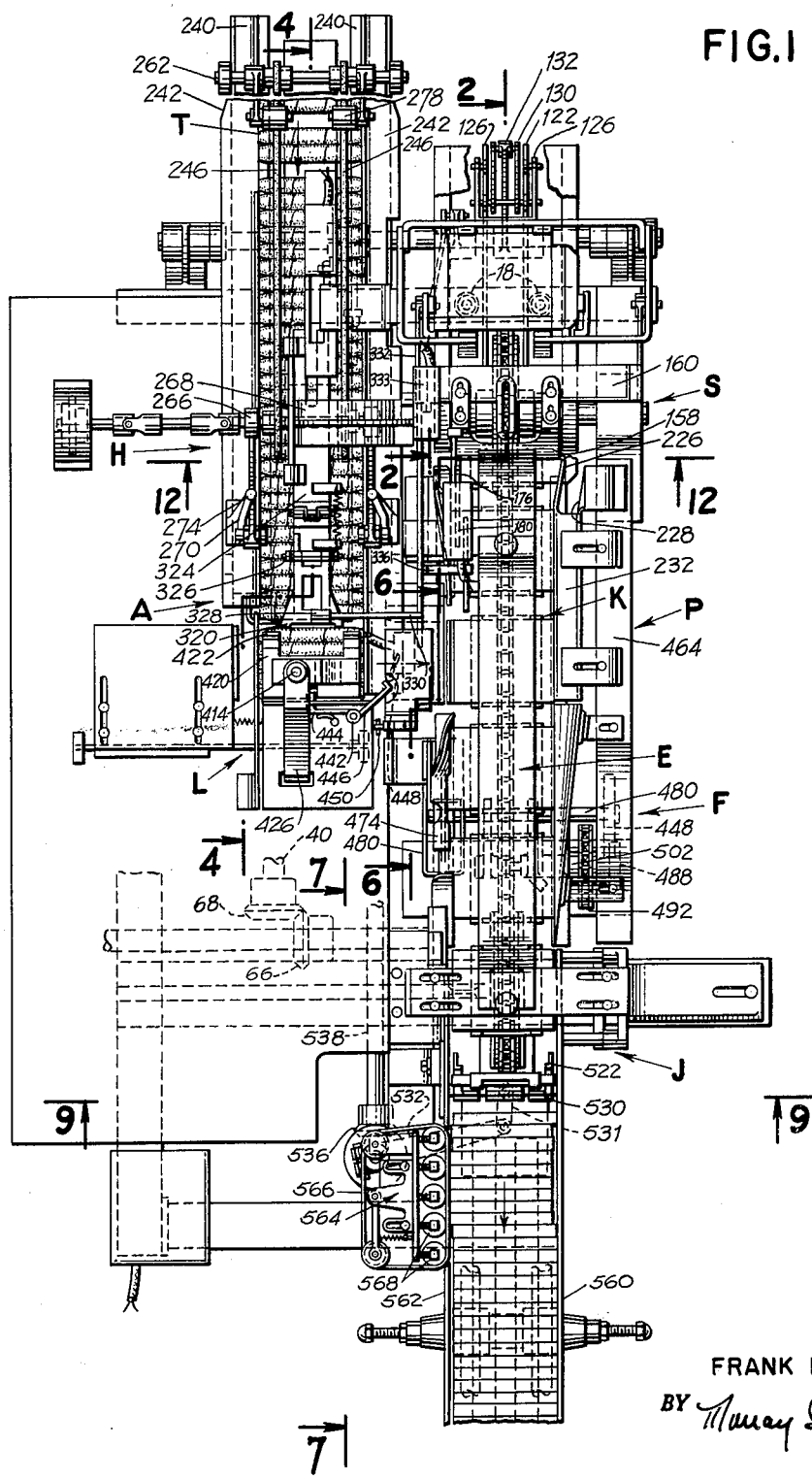

Oct. 26, 1965 F. HOLLENTON 3,213,589
CIGAR CARTONING MACHINE
Filed Dec. 2, 1960 15 Sheets-Sheet 1

INVENTOR.
FRANK HOLLENTON
BY Murray Schaffer
ATTORNEY

INVENTOR.
FRANK HOLLENTON

Oct. 26, 1965 F. HOLLENTON 3,213,589
CIGAR CARTONING MACHINE
Filed Dec. 2, 1960 15 Sheets-Sheet 3

INVENTOR.
FRANK HOLLENTON
BY Murray Schaffer
ATTORNEY

Oct. 26, 1965  F. HOLLENTON  3,213,589

CIGAR CARTONING MACHINE

Filed Dec. 2, 1960  15 Sheets-Sheet 4

INVENTOR.
FRANK HOLLENTON
BY *Murray Schaffer*

ATTORNEY

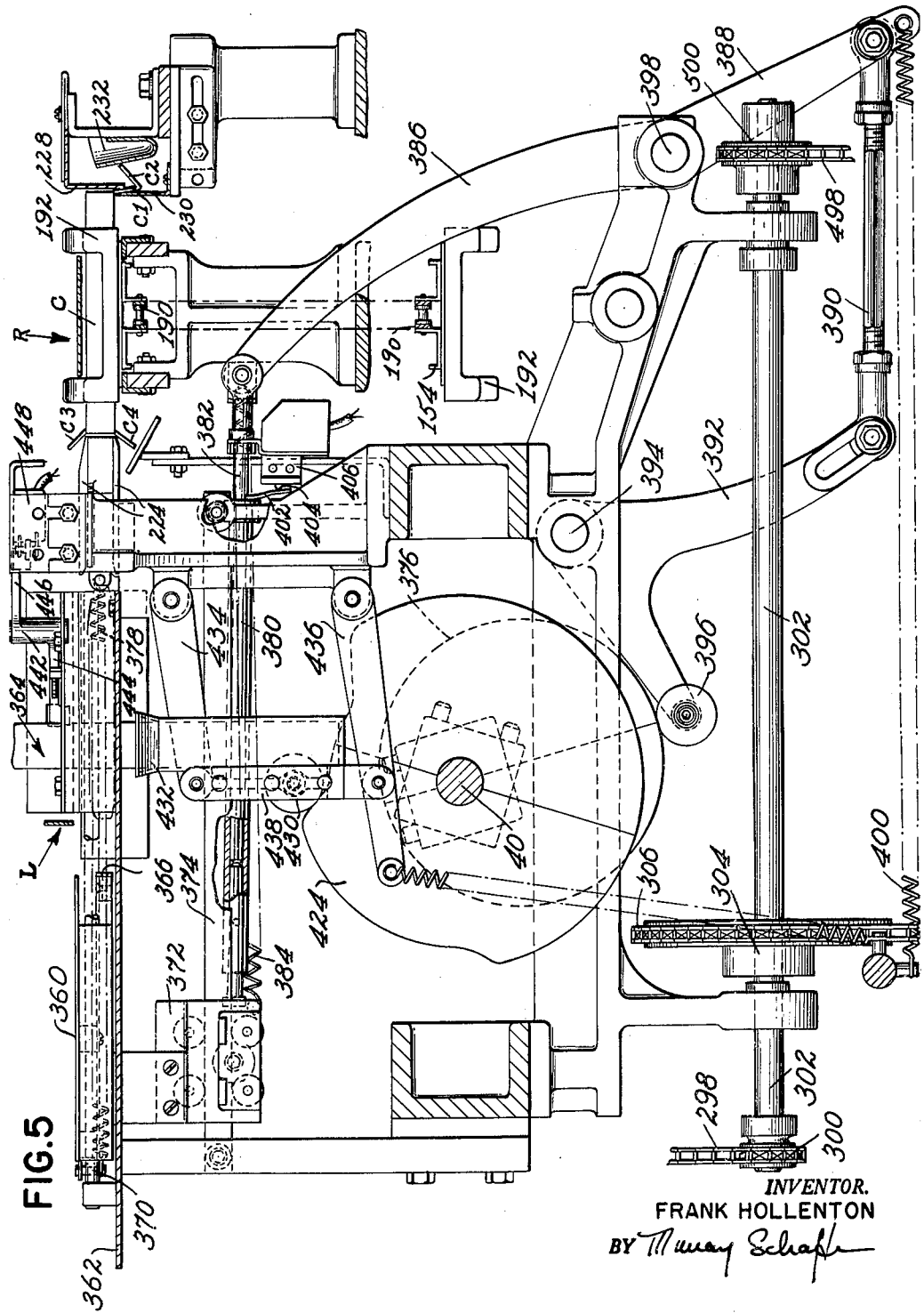

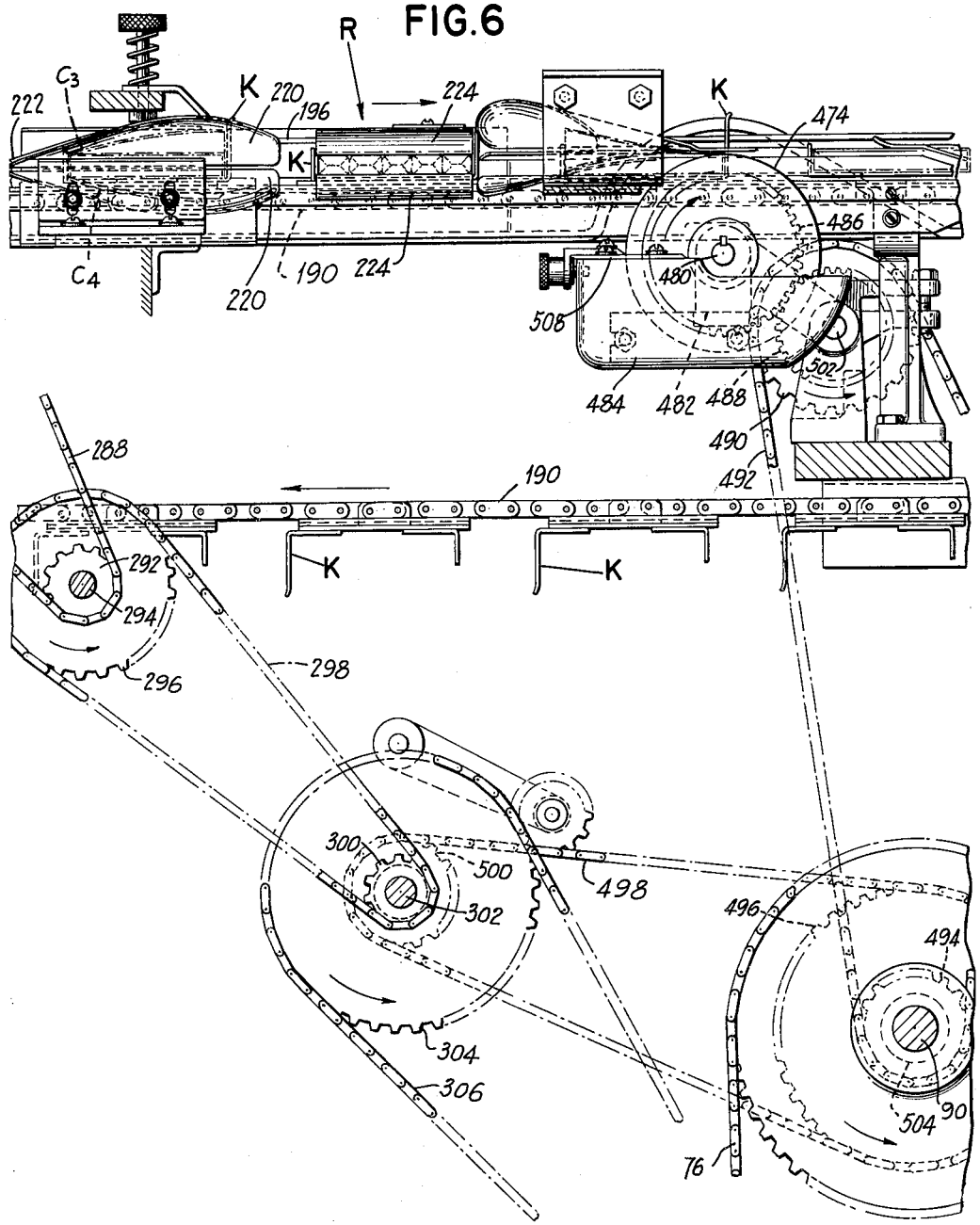

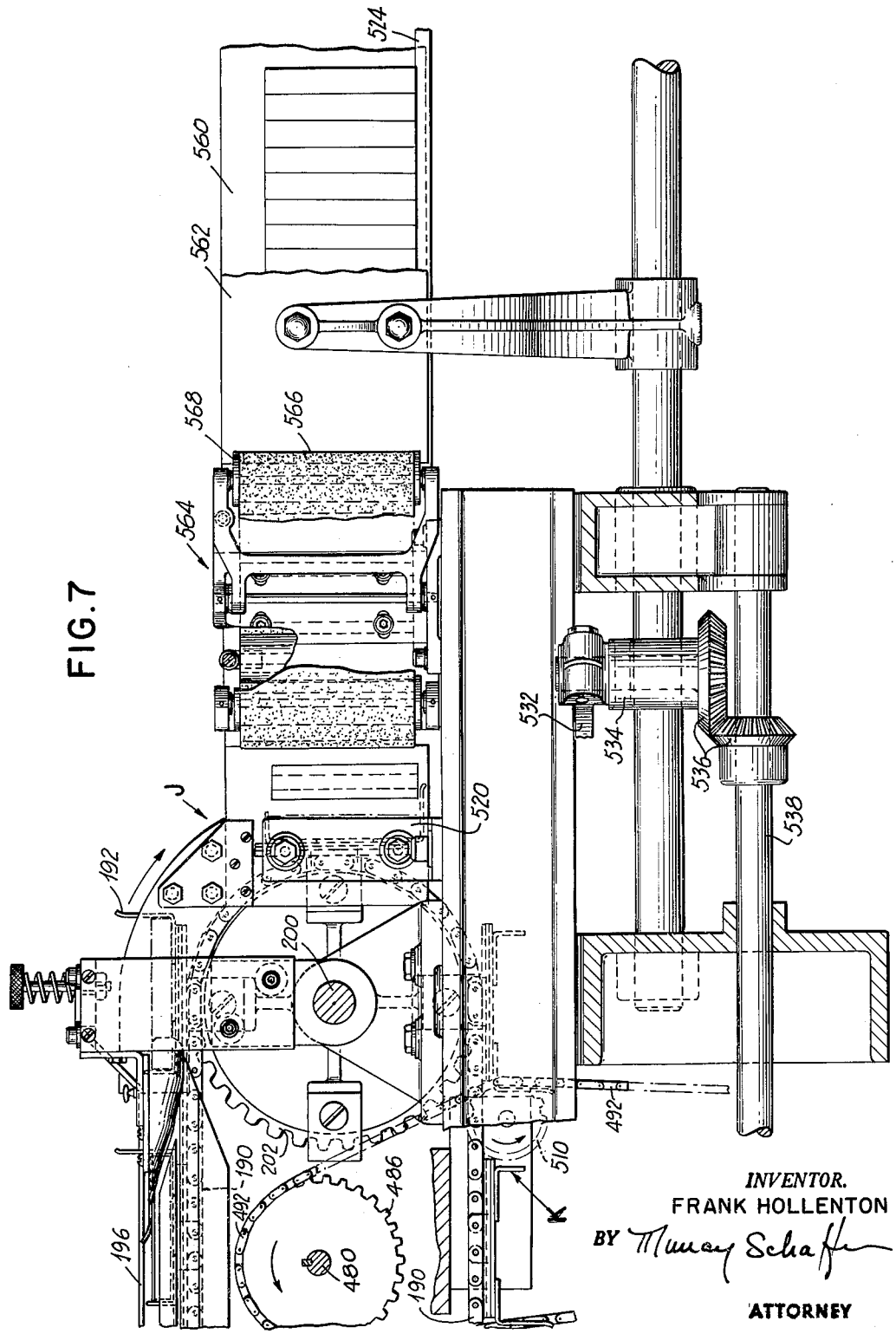

Oct. 26, 1965  F. HOLLENTON  3,213,589
CIGAR CARTONING MACHINE
Filed Dec. 2, 1960  15 Sheets-Sheet 8

INVENTOR.
FRANK HOLLENTON
BY
ATTORNEY

Oct. 26, 1965   F. HOLLENTON   3,213,589
CIGAR CARTONING MACHINE
Filed Dec. 2, 1960   15 Sheets-Sheet 10

INVENTOR.
FRANK HOLLENTON
BY *Murray Schaff*
ATTORNEY

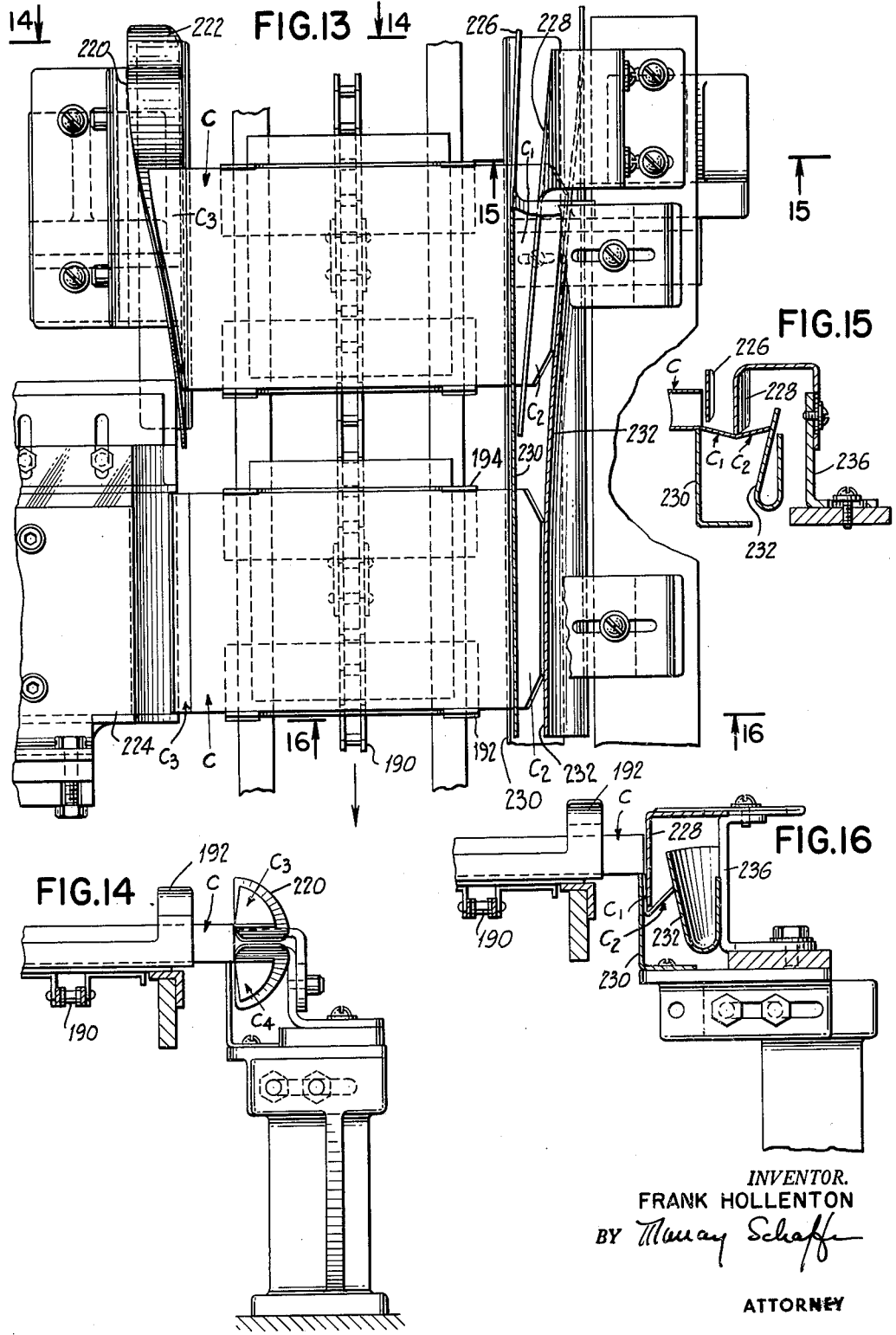

Oct. 26, 1965  F. HOLLENTON  3,213,589
CIGAR CARTONING MACHINE
Filed Dec. 2, 1960  15 Sheets-Sheet 13
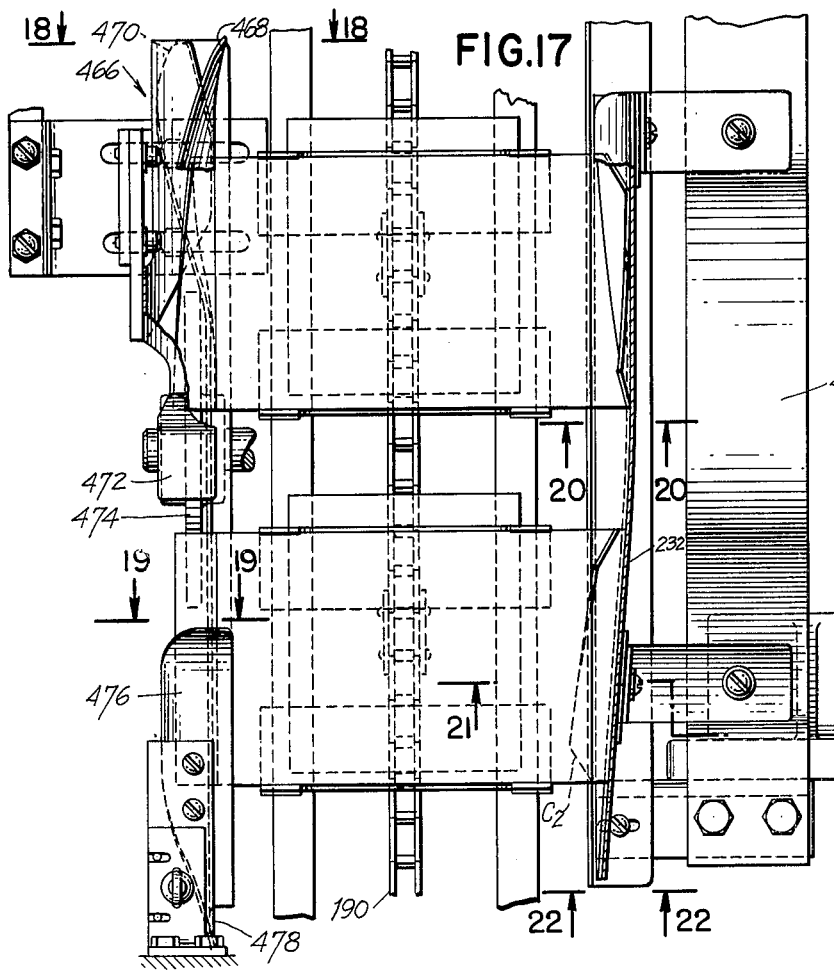
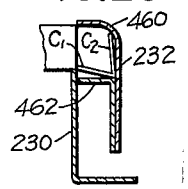
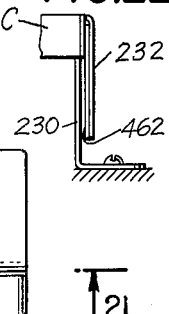
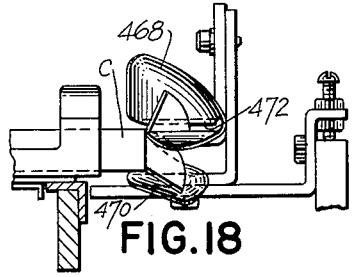
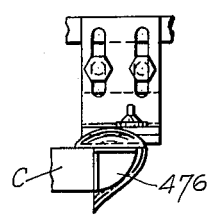
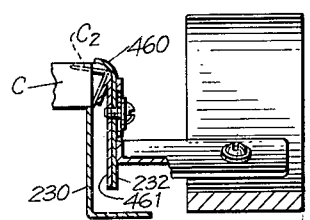
*INVENTOR.*
FRANK HOLLENTON
BY *Murray Schaffer*
ATTORNEY Oct. 26, 1965　　　F. HOLLENTON　　　3,213,589
CIGAR CARTONING MACHINE
Filed Dec. 2, 1960　　　　　　　　　　15 Sheets-Sheet 14

INVENTOR.
FRANK HOLLENTON
BY *Murray Schaff*

ATTORNEY

Oct. 26, 1965  F. HOLLENTON  3,213,589
CIGAR CARTONING MACHINE
Filed Dec. 2, 1960  15 Sheets-Sheet 15

INVENTOR.
FRANK HOLLENTON
BY Murray Schaffer
ATTORNEY

United States Patent Office 3,213,589
Patented Oct. 26, 1965

3,213,589
CIGAR CARTONING MACHINE
Frank Hollenton, Mountainside, N.J., assignor to American Machine & Foundry Company, a corporation of New Jersey
Filed Dec. 2, 1960, Ser. No. 73,265
12 Claims. (Cl. 53—55)

This invention relates to a machine for rapidly and economically packing groups of cigars, by grouping wrapped cigars in predetermined numbers, supplying and opening collapsed cartons, inserting the groups of cigars in the opened cartons, and closing the filled cartons.

Another object is to provide means for so synchronizing the various mechanisms of the machine that failure of the cigars to be supplied from the wrapping means to the cartoning means will automatically stop the cartoning means and thus avoid packaging groups of less than the desired number of cigars.

An object of notable importance is to provide an improved construction and improved means for making a machine which is readily adjustable to varying carton sizes as well as to varying cigar sizes and shapes.

A further object of this invention is to provide means for folding, closing, and tucking both the bottom and top ends of a filled carton.

An important object of the present invention is to provide a machine which is equipped with numerous interlocks to prevent the malfunction of the machine or to prevent the function of the machine when either cartons or cigars are missing or deformed.

Another object of the invention is to provide novel and efficient means for closing and sealing the package and for inserting the tongue flap after filling the package shell.

Other objects are to provide improved carton feeding an opening means and improved devices for inserting groups of cigars in opened cartons. Thus it is an object of the invention to provide an organized machine which will feed collapsed cartons from a stack and will automatically and without manual handling, open said cartons and insert individually wrapped cigars in said cartons, and close the cartons ready for marketing.

Another object of the invention is to provide an improved cigar package of a type which is as satisfactory as expensive packages and which at the same time is more inexpensive and easier to operate cigars from. With these and other objects not specifically mentioned in view, the invention consists in certain constructions and combinations which will be hereinafter fully described and then particularly pointed out in the claims hereunto appended.

Figure 2:
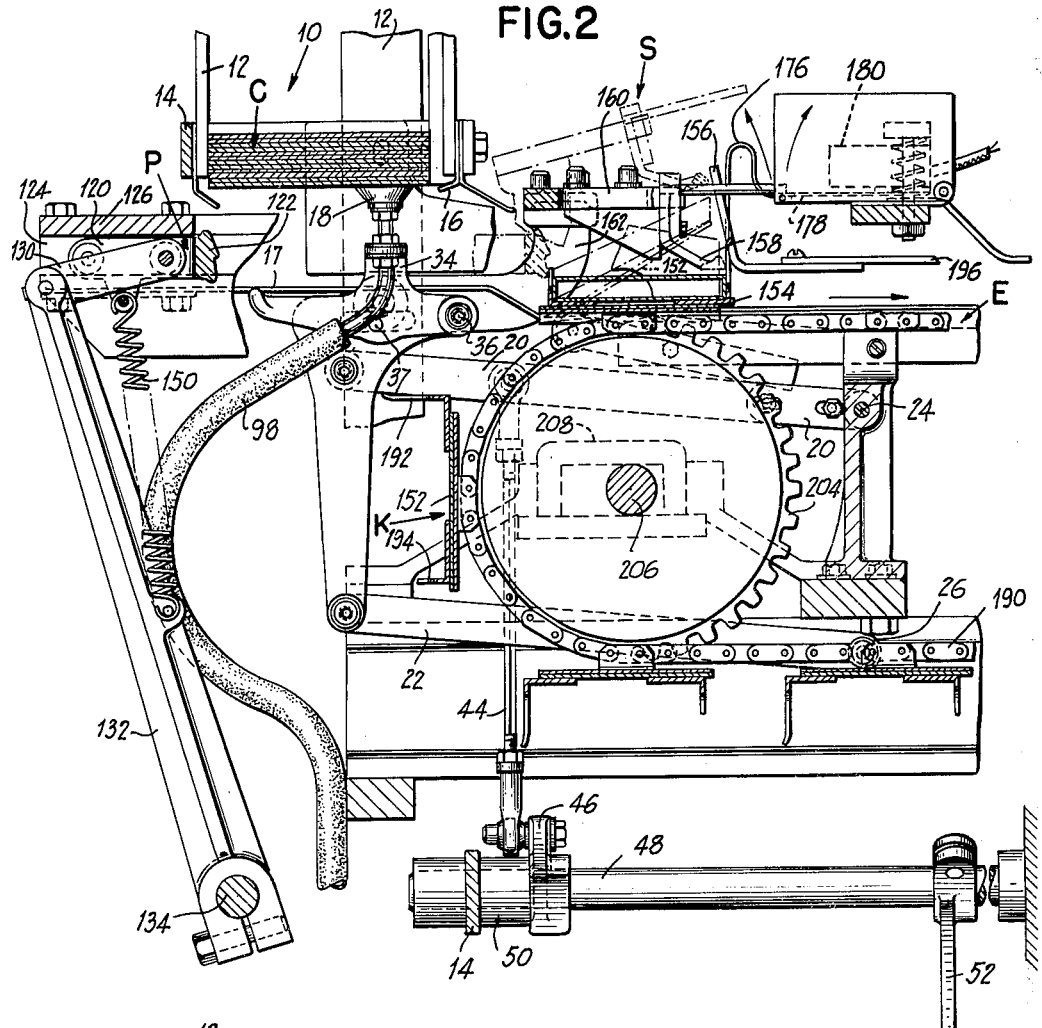
Figure 3:
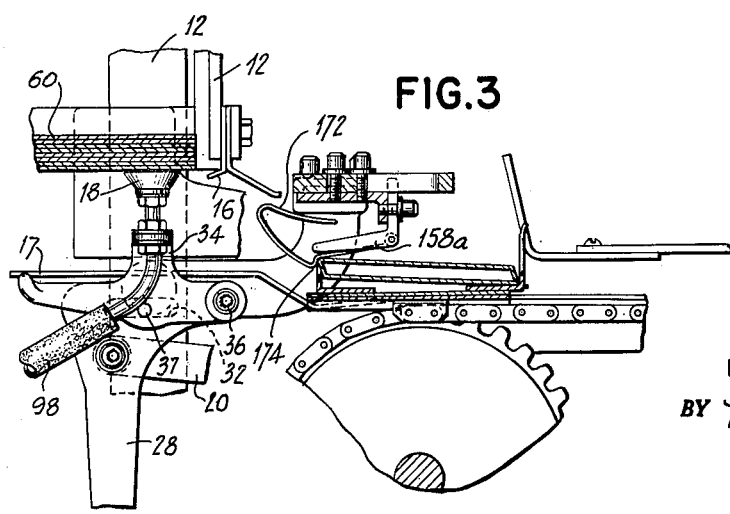
Figure 4:
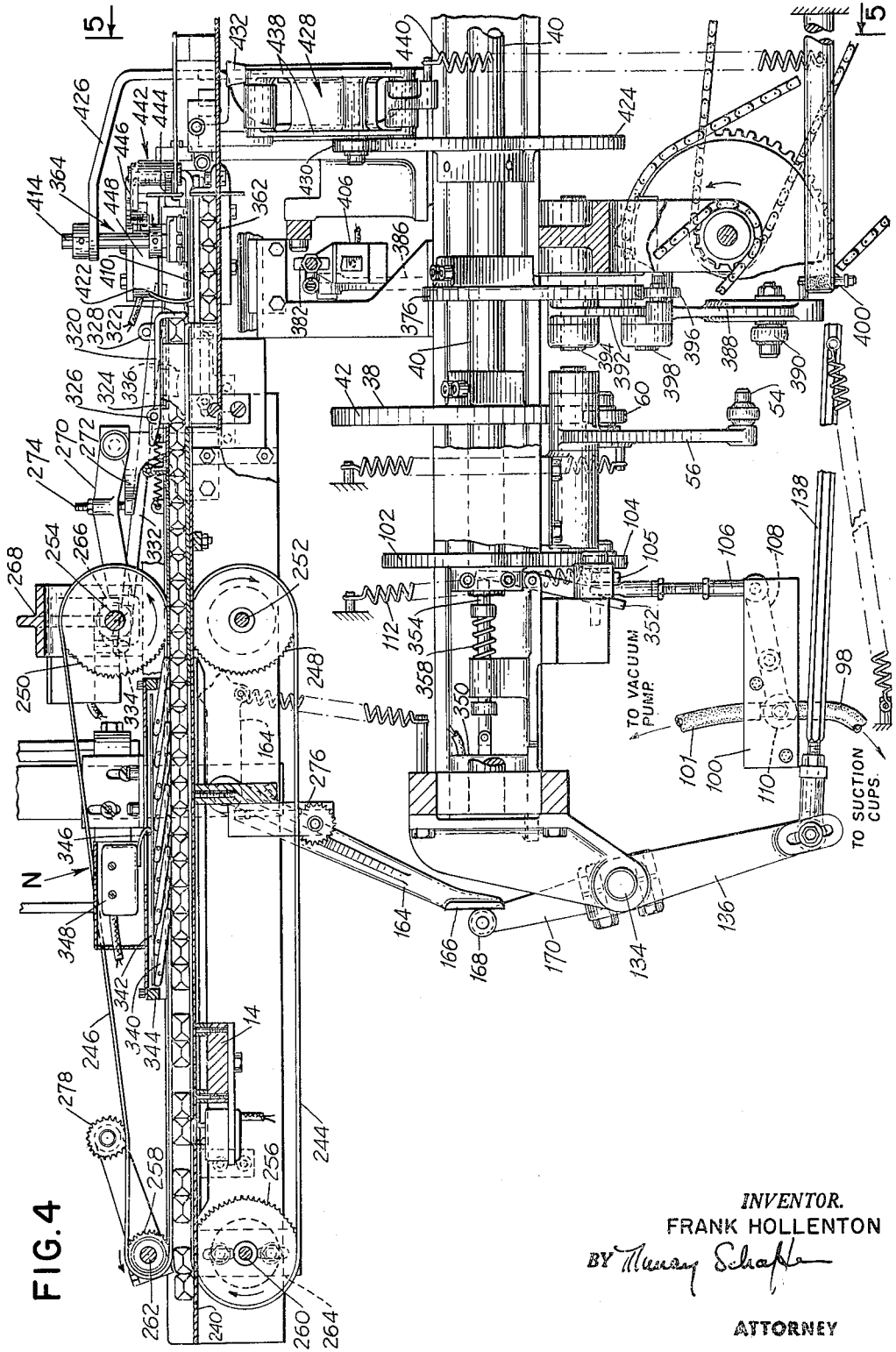
Figure 4A:
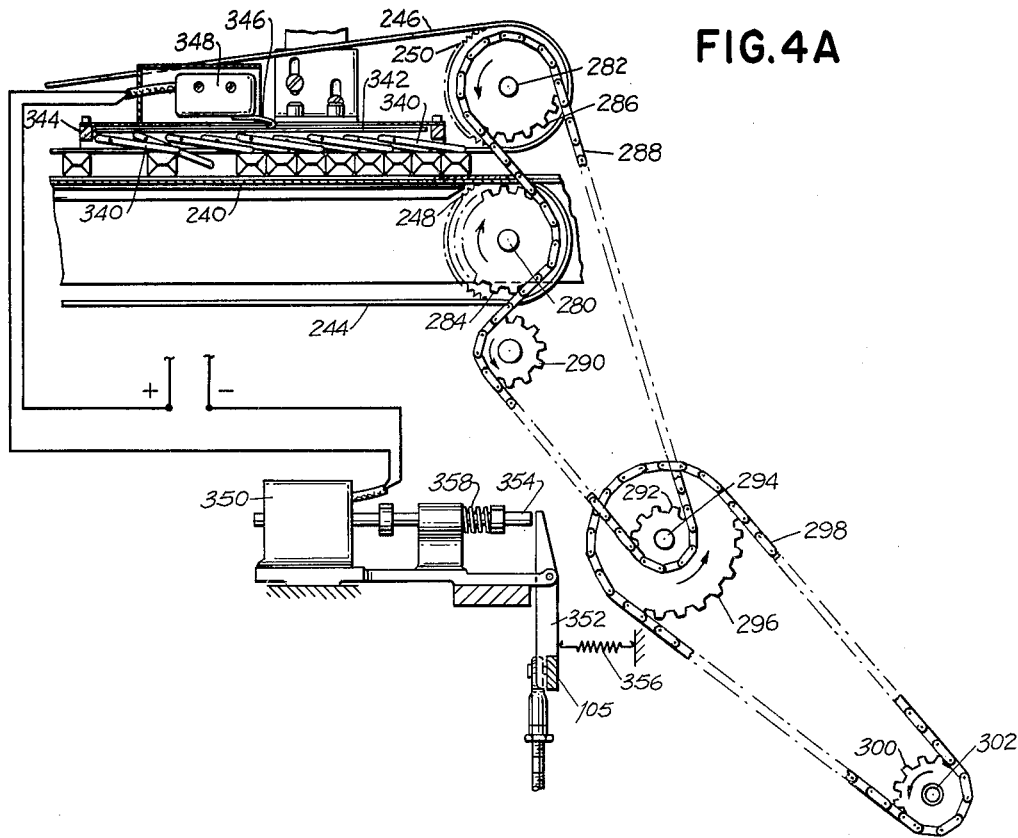
Figure 4B:
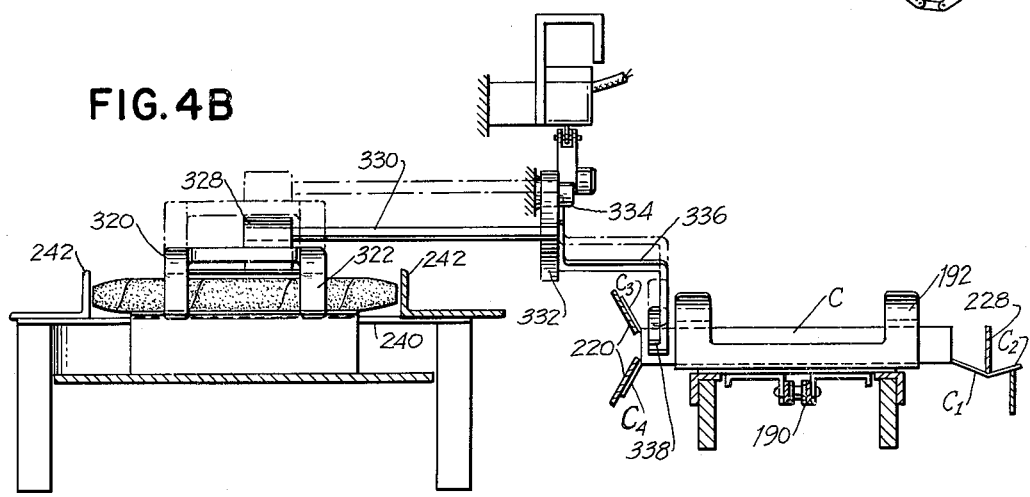
Figure 8:
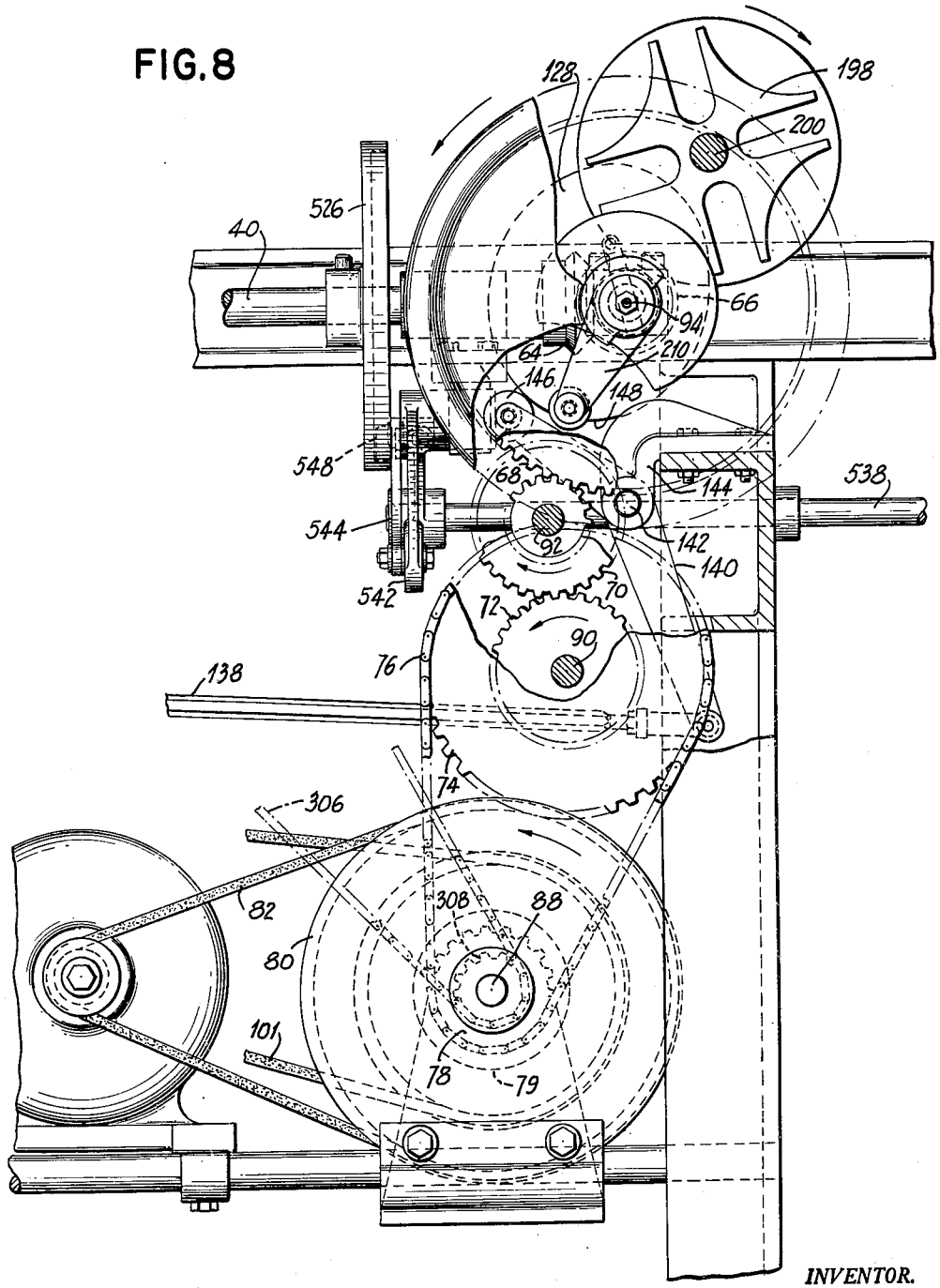
Figure 9:
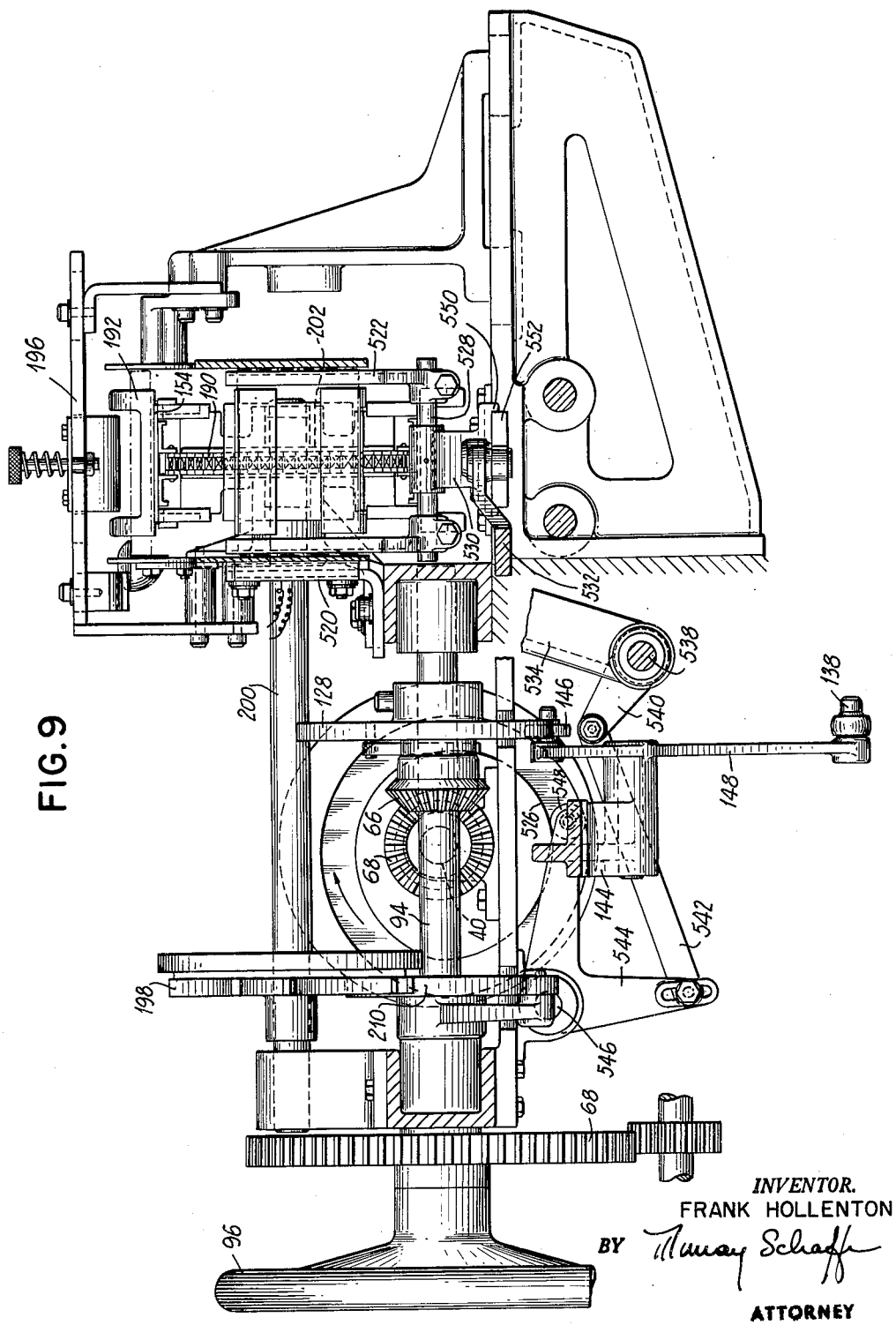
Figure 10:
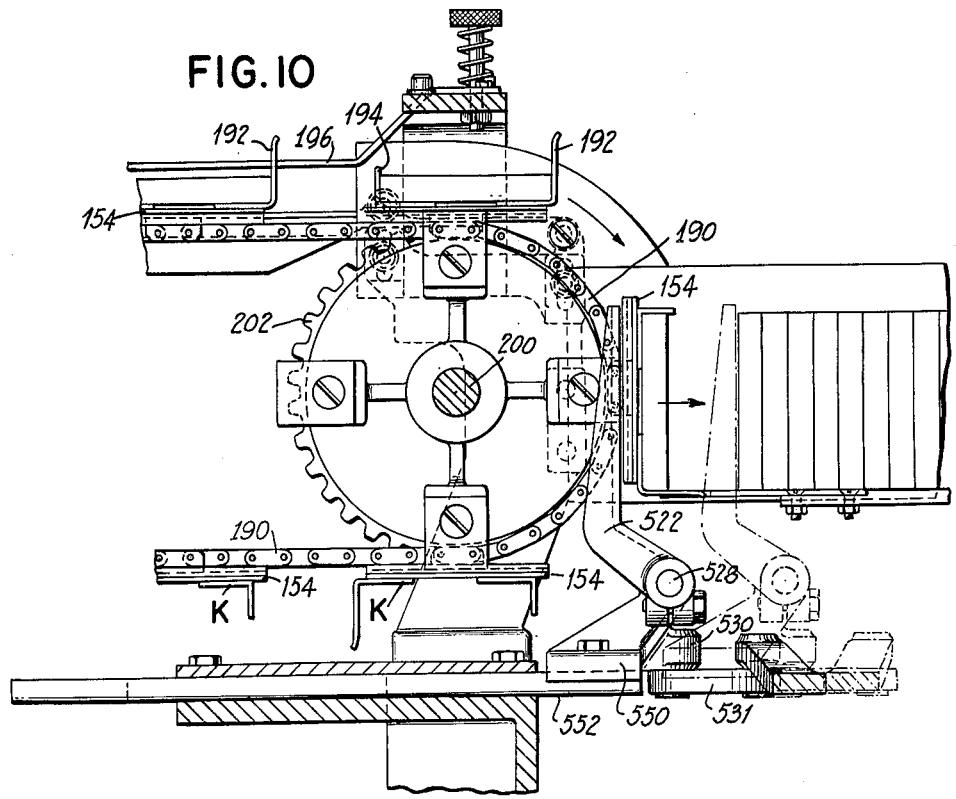
Figure 11:
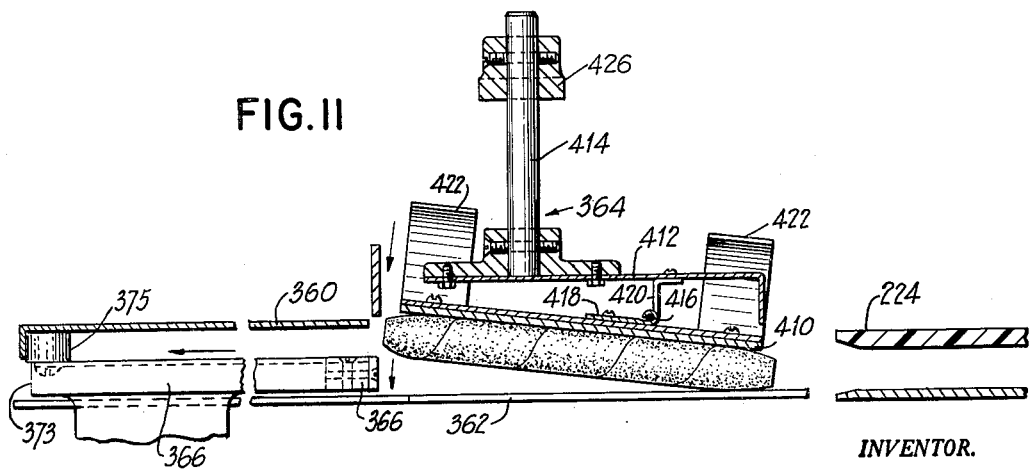
Figure 12:
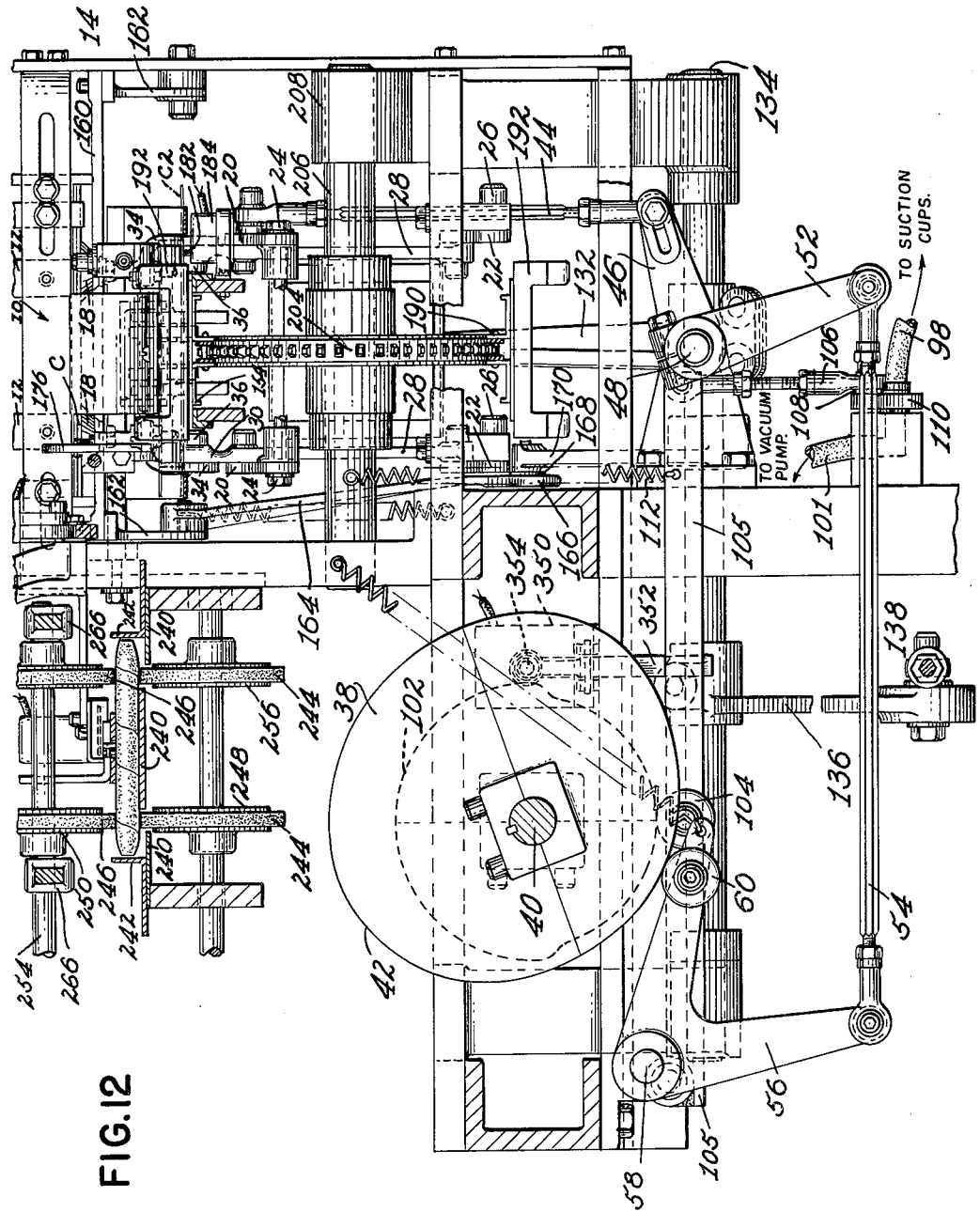
Figure 23:
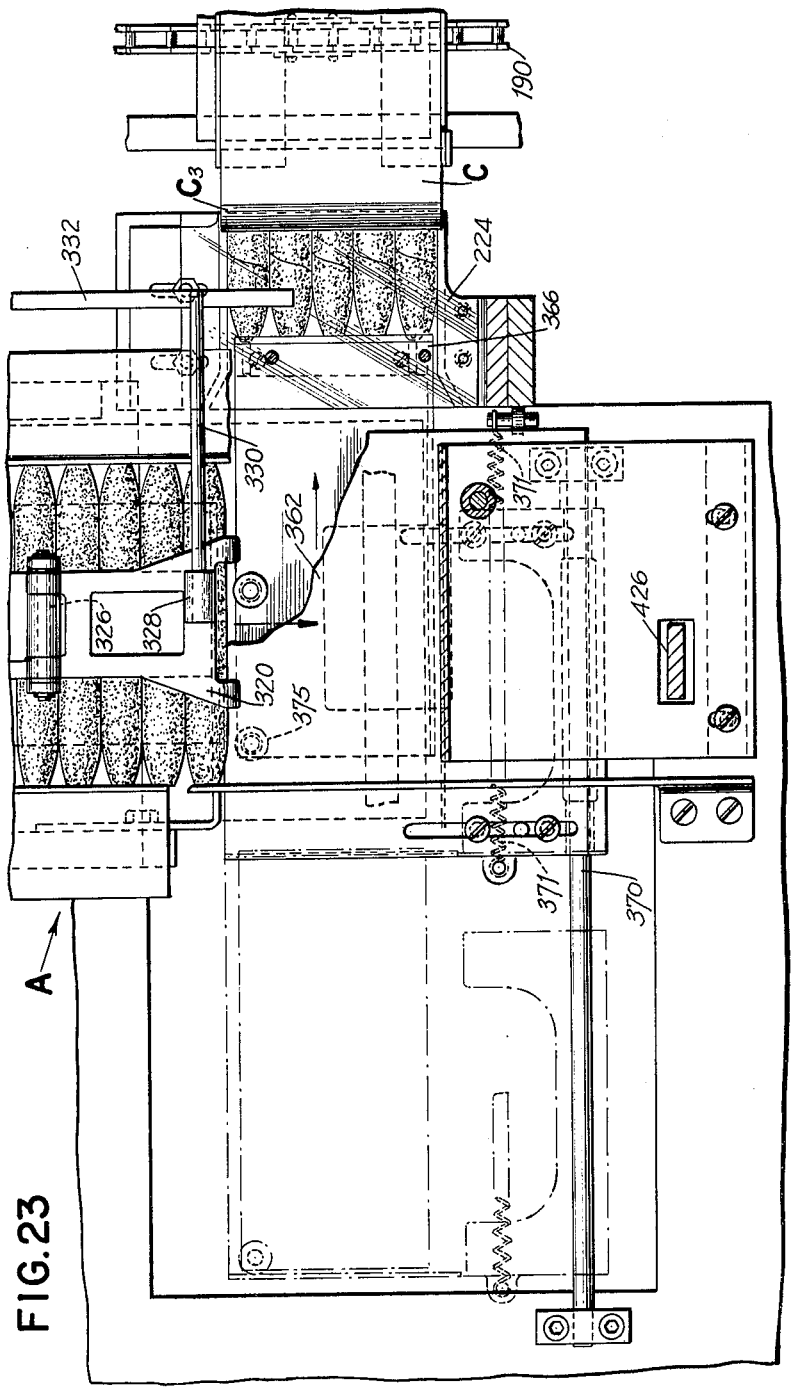
Figure 24:
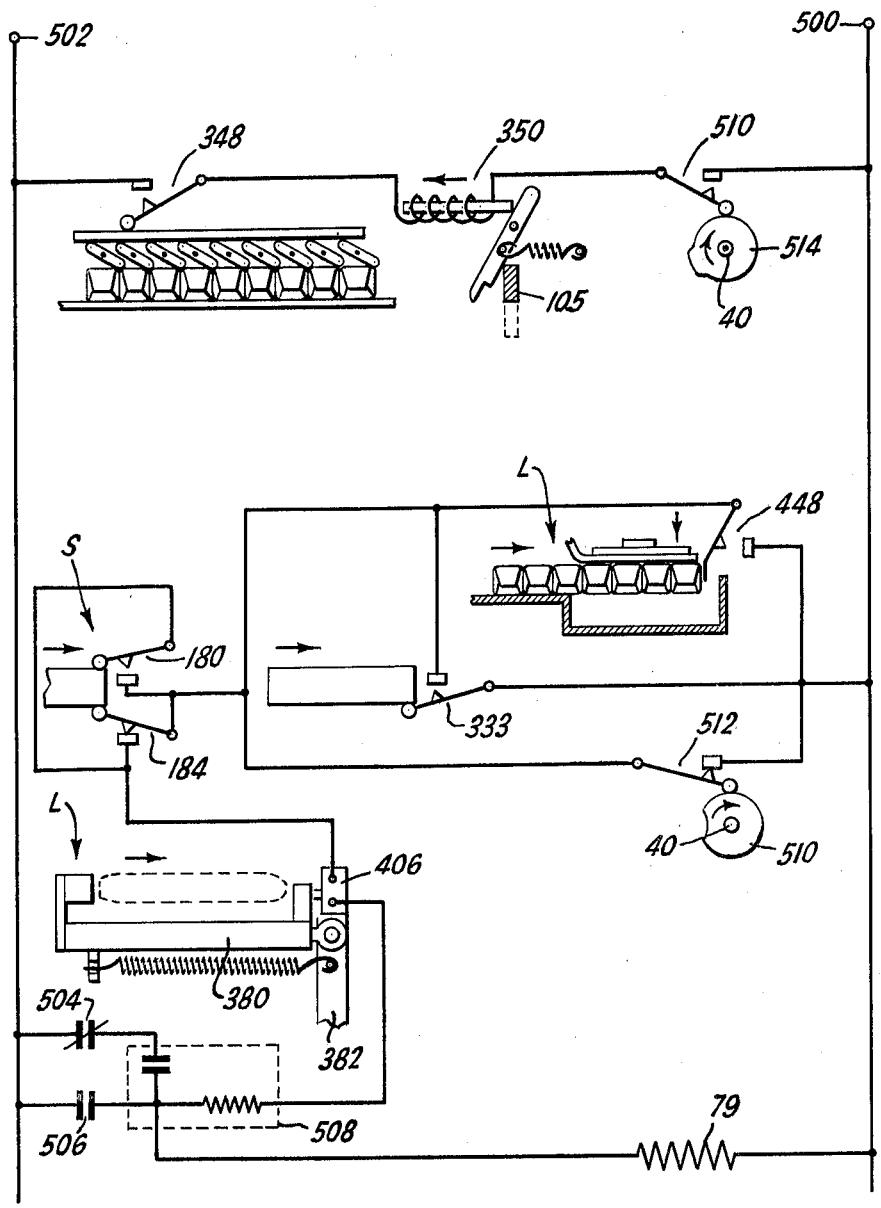

In the accompanying drawings in which like characters of reference indicate the same or like parts:

FIG. 1 is a plan view of the cigar cartoning machine,

FIG. 2 is a detailed sectional side elevation of the carton feed and opening mechanism, taken on line 2—2 of FIG. 1, FIG. 3 is a partial sectional side elevation of modified carton feed and opening mechanism, FIG. 4 is a partial sectional side elevation of the machine illustrating the cigar feeding mechanism together with some of the drive mechanism of the machine taken on line 4—4 of FIG. 1, FIG. 4a is a partial side elevation illustrating the cigar supply detecting mechanism together with the cigar feed drive mechanism, FIG. 4b is a partial sectional end elevation illustrating the cigar gating mechanism before reaching the inserting station of the machine, FIG. 5 is a sectional end elevation of the machine illustrating the cigar inserting mechanism, taken on line 5—5 of FIG. 4, FIG. 6 is a partial sectional side elevation of the machine illustrating the carton bottom end flap guiding and closing unit, taken on line 6—6 of FIG. 1, FIG. 7 is also a partial sectional side elevation of the machine, illustrating the filled carton delivery mechanism, taken on line 8—8 of FIG. 1, FIG. 8 is a partial side elevation of the machine illustrating the driving mechanism of the same, FIG. 9 is a sectional end elevation of the machine illustrating the carton delivery mechanism, taken on line 9—9 of FIG. 1, FIG. 10 is a detailed partial side elevation of the carton delivery mechanism, FIG. 11 is a partial sectional end elevation illustrating the cigar inserting mechanism, FIG. 12 is another sectional end elevation of the machine, taken on line 12—12 of FIG. 1, FIG. 13 is a partial plan view illustrating the carton and flap guiding and folding unit, FIG. 14 is a sectional end elevation illustrating the bottom end flap opening guides for the carton taken on line 14—14 of FIG. 13, FIGS. 15 and 16 are sectional end elevations of the top end flap folding guides taken on line 15—15 and 16—16 respectively of FIG. 13, FIG. 17 is a plan view of the carton end flap folding and closing guides, FIGS. 18 and 19 are sectional end elevations illustrating the closing operation of the bottom end flaps of the carton, taken on line 18—18 and 19—19 respectively of FIG. 17, FIGS. 20, 21 and 22 are sectional end elevations illustrating the closing operation of the top end flaps of the carton, taken on lines 20—20, 21—21 and 22—22 respectively of FIG. 17, FIG. 23 is a partial plan view of the machine illustrating the cigar inserting mechanism, and, FIG. 24 is a schematic wiring diagram illustrating the automatic control circuit of the machine.

In the particular embodiment herein illustrated, there is provided in combination with instrumentalities for successively wrapping cigars in individual wrappers and for forwarding the same together with means for receiving the individually wrapped cigars and grouping the same in cartons containing a predetermined number of cigars, mechanism for supplying opened cartons and devices for successively inserting the groups of cigars in said cartons. Preferably there is provided mechanism for engaging the wrapped cigars prior to insertion thereof in the carton operating to stop the operation of said devices if a group is incomplete. The various means referred to may be varied widely in construction within the scope of the claims, for the particular device selected to illustrate the invention is but one of many possible concrete embodiments of the same. The invention therefore is not to be restricted to the precise details shown and described nor to the particular embodiments chosen as illustrative of the invention.

Referring now to the drawings (particularly FIGS. 1, 2, and 12) a supply of collapsed tubular cartons C is stacked in a carton magazine or hopper H. The hopper H comprises a number of elongated vertical rods 12 mounted on the frame 14 of the machine. The rods 12 are adjustably mounted to the frame 14 so that the hopper may be made to accommodate varied sizes of cartons C in their flat collapsed state. The cartons are stacked horizontally in the hopper H upon a bevelled or hook-like member 16, and are moved from the stack, one-by-one, by the operation of a pair of identical suction cup members 18 which pull the lower most carton downwardly beyond the hook member 16 onto a delivery platform 17 and into the path of a carton plunger P so that it may be pushed forward into a pocket K at the set-up position S of an intermittently moving endless conveyor E which moves through a plurality of indexed positions.

Suction cups 18 (FIGS. 1, 2, and 12) are identically formed and are interconnected for simultaneous movement, by a parallel actuating mechanism, which comprises for each cup 18 a pair of substantially horizontal bars 20 and 22 which are pivotally mounted at one end 24 and 26, respectively, to the frame of the machine and at their other ends interconnected by a pair of vertical tie bars 28. Each tie bar 28 is formed having an enlarged head 20, somewhat in the shape of a hammer head, in which is formed a horizontal slotted portion 32. Each suction cup 18 is mounted on the stem of an inverted T shape holder member 34 pivotally connected at the end 36 of one arm to the corresponding tie bar 28. Each holder member 34 is provided with a small transversely protruding pin 37 extending within the slot of the cooperating tie bar 28 so that, should either one of the tie bars 28 be moved downwardly from the position shown in FIG. 2, each suction cup 18 will be forced to move downwardly and tilt slightly toward the set-up position S along the direction shown by the arrow.

A vertically reciprocating action imparted to the parallel mechanism will, of course, cause the feeding of successive cartons to the set-up point. This is accomplished by connecting the parallel mechanism to a rotating cam 38 (FIGS. 4 and 12) journalled on a cam drive shaft 40, the cam 38 having a track 42 designed for this purpose. The connection is made from one of the upper horizontal bars 20 (FIGS. 2 and 12) through an adjustable rod 44, an arm 46 fixedly mounted to a rotatable shaft 48 mounted in bearings 50 on portions of the frame 14, a second arm 52, elongated link 54, and a bell crank 56 (FIGS. 4 and 12) pivotally mounted on shaft 58. The bell crank 56 has a cam roller 60 which engages the track 42 of cam 38. Spring 62 is used to bias roller 60 against track 40.

Shaft 40 is driven (FIG. 8) by motor M through right angle bevel gears 64 and 66, gears 68, 70, 72, sprocket 74, chain 76 running over sprocket 78, journalled on the output shaft of a magnetic clutch 79, pulley 80 and belt 82 running over pulley 84 on motor M drive shaft 86. Pulley 80 and the input of magnetic clutch 79 are journalled on main drive shaft 88, sprocket 74 and gear 72 are journalled on shaft 90, gears 70 and 68 are journalled on shaft 92 and bevel gear 66 is journalled on shaft 94, all in a suitable manner. Shaft 94 is also provided with a hand wheel 96 (FIGS. 8 and 9) to permit manual operation of the machine if desired.

Suction is provided in each of cups 18 through flexible hose 98 (FIG. 2) valve 100 (FIGS. 4 and 12) and hose 101 leading to a vacuum pump not shown but operated by belt drive 101 from main drive shaft 88 (FIG. 8). Valve 100 is operated by cam 102 journalled on shaft 40 through connection with follower 104, arms 105, 106, and 108 and rotary valve member 110. Spring 112 normally biases the follower 104 into engagement with cam 102 so as to control rotary member 110 automatically. Automatic and manual control means 107 (to be described later in detail) is provided to shut valve means 100 in the event there is an insufficient number of cigars in this machine to fill a carton.

The carton plunger P which pushes the dropped carton into pocket K, comprises a rolling pusher member 120 having an indented face portion 122 beneath which the edge of the carton C may be engaged. The pusher member 120 is reciprocated in slideway 122 formed by slide strips 124 which are secured to frame 14. This action is accomplished by connecting pusher member 12 to a rotating cam 128 journalled on power shaft 94 (FIG. 8). This connection comprises (FIG. 2) link 130, arm 132 which is fixed to transverse shaft 134, arm 136 (FIG. 4) also fixed to shaft 134, rod 138, and a bell crank cam follower mechanism 140 (FIG. 8) which is pivoted at 142 on bracket 144 attached to the frame 14. The follower mechanism 140 has a roller 146 engaging track 148 on the cam 128. Shaft 94, as described previously, is driven by motor means M. A spring 150 (FIG. 2) is provided between link 130 and arm 132 to permit a degree of relative, but substantially conjoint movement of the parts.

Returning to FIG. 2, the set-up position S is provided with a pair of flat, highly resilient springs 152 sticking up through a substantially horizontal platform 154 so that the flat collapsed carton C will enter pocket P with its front end extending upwardly. The set-up position S is also provided with a flat guide strip 156 mounted on the frame against which the front end of the carton will abut and which will force the rear end of the carton into the pocket K. A carton depressor mechanism D is provided to force the insertion of the carton C, after it has reached the set-up position S, into the pocket K and to simultaneously cause the opening of the carton into its squared rectangular shape. The carton depressor mechanism comprises a curved finger or guide plate 148 mounted to bracket 160 which is fastened to the ends of a pair of arms 162 pivotally secured to frame 14. A pedal lever 164 (FIGS. 4 and 12) is secured to the inner one of the pair of arms 162 and is formed at its lower end with a track 166 which engages roller 168 carried on arm 170. Arm 170 is fixed on the rotatable shaft 134 so that it will reciprocate in the same manner as the plunger arm 132.

The curved guide 158 shown in FIG. 2 is formed to depress the front end of the carton C, since, it will be recalled, the carton enters the pocket K with its front end up (seen in dotted lines). The combined action of both the plunger member 122, the guide finger 158, and the square sides of pocket K, set up the carton in squared rectangular form.

A modified form of the carton depressor is shown in FIG. 3. This modification is designed to permit the collapsed carton to enter the set-up position S with its front end down since, in some instances, this may be preferred. In FIG. 3, the curved guide finger 158a is formed to extend rearwardly of the pocket K. The spring guide 152 (FIG. 2) has been removed, and, as an alternate, a resiliently curved guide 172 is mounted directly on finger 158a so as to extend rearwardly into the delivery area beneath the carton hopper H so that when the carton is brought down by suction cups 18, it will engage the face of the guide 172 and be forced, front end down, into pocket K. As the carton enters pocket K and the depressor D moves downwardly, the rear end of the carton is caught on a hook formation 174 of the spring clip 172 and as the depressor D is further lowered, the carton is completely forced into the pocket K and set up in square form. It will be noted that, except for the formation of guide 158a and the addition of spring 172, the mechanism of this modification has been unchanged from that shown in FIG. 2.

Sensor means are provided to sense the complete erection of a carton at the set-up position S and to control the feed of cigars. The sensing means (FIGS. 2 and 12) comprise a wire feeler 176 located at the upper front inner edge of the set up position S, controlling a contact 178 of a micro-switch 180 and a push button contact 182, located at the lower front outer edge of the set-up position S, controlling a micro-switch 184. The feeler 176 senses the squaring of the front panel of the carton while button 182 senses the setting of the carton in pocket K. Micro-switch 180 is normally made while switch 184 is normally open. When the carton seats within the pocket, the reversal of the switch positions occurs, thereby controlling the feed of cigars, in a manner to be described later, so that the cigars are fed to a receiving position R on conveyor E only when a fully opened and ready carton will be available.

The conveyor E comprises an endless chain 190 on which are mounted a plurality of carton receiving pockets K. Each pocket is formed with a platform 154, a front wall 192, and a rear wall 194. The front and rear walls and the platform of the pocket K have open portions to permit the sensing of carton positions as described. A carton retaining cover 196 is mounted on frame 14 above the conveyor belt to prevent the cartons from popping out of the pockets P. Both the front and rear walls 192 and 194 are adjustable secured to the platform 154 in order that they may be moved readily to accommodate cartons of varying sizes.

The carton conveyor chain 190 is indexed intermittently from position-to-position by a Geneva wheel 198 (FIG. 8) secured to shaft 200, on which is mounted a sprocket wheel 202 (FIG. 7) carrying the chain 190. The other end of chain 190 is carried by an idler sprocket 204 (FIG. 2) journalled on shaft 206 which is secured in a bearing block 208 mounted on frame 14. The Geneva wheel 198 (FIGS. 8 and 9) is driven by coacting crank arm 210 journalled on shaft 94 and driven through the connections, previously described, by motor M.

From the set-up positions S, the conveyor is indexed to move the pockets K step-by-step to a cigar receiving position R, a folding and sealing position F and finally to an ejecting station where the fully loaded cartons are delivered. Along the length of the conveyor E are vertical guide rails which are shaped to accommodate and fold the top and bottom flaps of the carton while they are moving on the conveyor E. It will be seen from FIGS. 5 and 6 and FIGS. 13-21, that the carton employed is provided with a hinged flap $c1$ having a tongue $c2$ at its upper end and a pair of bottom flaps $c3$ and $c4$ through which the cigars are to be inserted. For the purpose of maintaining the bottom flaps, $c3$ and $c4$, open for the insertion of the cigars, the vertical guide rail, between the set-up position S and the receiving positon R, is an adjustable tapered plow 220 (FIGS. 13 and 14) so that its leading end portion 222 enters between the flaps $c3$ and $c4$ and spreads them apart as shown in FIG. 5. As the carton progresses to the receiving position R, the flaps $c3$ and $c4$ are transferred to the outer edges of a tapered funnel device 224 which is used to compress and guide the cigars to be loaded into the carton. Thus, the flaps $c3$ and $c4$ are not only opened, but are made to assist in the filling of the carton C.

During the movement of the carton C from the set-up position S to the cigar receiving position R, the process of folding and tucking the top flap and tongue is started. As a carton is moved from the set-up position S in the pocket K of the conveyor E, the tongue and flap $c1$ and $c2$ are projecting horizontally. This tongue and flap $c1$ and $c2$ are ordinarily scored in the position along which it is to be bent during the manufacture of the cartons which facilitates the folding and tongue inserting operations. The tongue and flap enter under a tapered projecting finger 226 (FIGS. 1, 5, 13, and 15) and a vertically depending plate 228 which breaks the hinge of the flap $c1$ over the edge of an upwardly extending vertical plate 230 (FIG. 5). The two plates 228 and 230 being curved so that as the carton progresses to the receiving station R, they are spaced apart barely the width of the carton wall. Simultaneously, the end of the tongue $c2$ engages a compound curved guide plate 232, causing its hinge to break over the edge of the depending plate 228. The plate 232 extends the length of the conveyor E and is curved so that it alone tucks the tongue $c1$ into the carton as will be described later. However, at the receiving position R, the plate 232 is such that the tongue $c2$ gradually is bent upwardly, thus starting the tucking of said tongue into the carton. It will be noted that the depending plate 228 serves the added purpose of providing a stop at the end of the carton for the cigars which are to be inserted. The situation the carton attains when it reaches the cigar receiving position R is shown clearly in FIG. 5.

Both the plates 228 and 230 as well as all the guide and folding rails, which will be described later, are adjustably secured on suitable brackets and mountings as shown in detail in FIGS. 13-21, so that they may be moved to accommodate different size cartons.

It will be recalled that the present machine is for use in conjunction with associated mechanism for banding and wrapping cigars. Thus, the present machine has been designed so that fully wrapped and banded cigars T are fed from such mechanism to an infeed table I, which is adjustably positioned to accept cigars directly from the delivery end of the associated mechanism (at the left end of FIG. 1 not shown). The cigars T are carried transversely along a belt conveyor device to an accumulating position A from whence a predetermined number of cigars, corresponding to the number to be inserted in each carton, is transferred to a loading station L.

The infeed table I (FIGS. 1, 4, 4a and 12) comprises a split platform 240 mounted on the frame 14 along the side of which are adjustably mounted vertical guide rails 242. The conveyor itself comprises a pair of lower friction chain belts 244 running substantially in the plane of the platform 240, and a pair of upper friction chain belts 246, adjustably mounted so as to run barely a cigar width above the lower belts 244. The belts 244 and 246 are respectively driven by two pairs of sprockets, 248 and 250, journalled on shafts 252 and 254, respectively, at the forward end of the infeed table I and run over two pair of idler sprockets 256 and 258 journalled on shafts 260 and 262 respectively, at the rearward end of table I. Shaft 262 at the rearward end of lower belt 244 is mounted so as to be adjustable in a vertical direction, in suitable bearing brackets 264 while the shaft 254 at the forward end of the upper belt 246 is mounted in adjustable bearing blocks 266 located on U-shaped bracket 268 fixed to the frame. Extending forwardly of each of bearing blocks 266 is an arm 270 pivoted at its ends to a stationary bracket 272. Screw 274, threaded through arm 270, seats on bracket 272 and is provided to allow vertical adjustment of the shaft 252. By adjusting the height of shafts 254 and 260, the distance between the lower belts 244 and the upper belts 246 may be varied to accommodate any size cigar and to exert a moderate force or pressure on the column of cigars which are ready to file into the loading position. Adjustably mounted sprockets 276 and 278 are also provided to vary the tension upon friction belts 244 and 246.

Shafts 252 and 254 are driven (FIGS. 1 and 4a) by motor M through universal connecting rods 280 and 282, sprockets 284, 286, chain 288 running over idler sprocket 290 and sprockets 294 and 296 journalled on shaft 294, chain 298 running over sprocket 300, journalled on shaft 302. Shaft 302 (FIG. 6) is further driven by sprocket 304, chain 306 and sprocket 308, journalled on main drive shaft 88 driven by motor M. It will be observed that sprocket 308 is journalled on the shaft 88 directly, by passing the clutch 79. Thus, shaft 302 and consequently the friction belt drive will be constantly in operation.

Through the interconnection of gear means 280 and 282, the lower and upper belts 244 and 246 are driven at the same speeds so that there will be no unwanted turning or twisting of the cigars while they are on the belt. The belts are driven at a speed slightly greater than that at which the cigars T are fed to the infeed table I from the associated mechanism, causing the cigars to accelerate, separate and finally bunch up at the end of the infeed table I when stopped by gate member 320 having a pair of depending legs 322 extending into the path of the cigars. The gate 320 serves the dual purpose of bunching the cigars and withholding their delivery to the loading station L until the loading station has been cleared of the cigars previously delivered thereto. Gate 320 is mounted on plate 324 which depends from U-shaped bracket 268 to a position over the cigars. Gate 320 is pivoted about hinge member 326. Extending transversely from a boss 328 on the top of the gate 320 toward the carton conveyor is a rod 330 having its end resting upon a lever 332 which extends to the rear of the machine and is pivoted to the frame 14 at point 334 (FIGS. 4 and 13).

Extending transversely from lever 332 (FIG. 13) is an angle arm 336 having a roller or tapered shape 338 at its ends which depends into the path of carton C on the conveyor between the set-up position S and the cigar receiving position R. Normally, the lever 332 is depressed, however, when a fully set-up carton C passes beneath the same, it is lifted, as shown in outline in FIG. 4a, and carries with it the gate member 320, thus permitting a sufficient number of cigars to enter the loading position L. Also, as lever 332 is lifted, it makes micro-switch 333 controlling cigar insertion mechanism explained hereafter. Thus, only when a carton is delivered and set upon the carton conveyor can cigars be released from the cigar conveyor for delivery to the loading position L. It will be observed that the introduction of the carton to pocket K and the release of cigars to the loading position L are indexed to occur at the same time so that both the carton and cigars will thereafter reach the receiving position R simultaneously.

During the passage of the cigars along the infeed table, the presence of the cigars are sensed to determine that an adequate number are available for the continued operation of the machine. This is accomplished by sensing means N mounted on frame 14 about the cigars (FIGS. 1 and 4a). The sensing means N comprise a plurality of gravity biased fingers 340 pivotally depending below a light metal plate 342 pivoted within a housing 344. The weight of each of the fingers 340 is such that it alone can pull at the plate 342 and move it upwardly into engagement with a trigger 346 on a micro-switch 348. Micro-switch 348 prevents the feeding of cartons from the hopper by acting on solenoid 350 operated latch member 352 to close previously noted suction valve 100 until the requisite number of cigars are contained in the conveyor belt. Solenoid 350 is activated when an insufficient number of cigars is sensed by means N (i.e., micro-switch 348 is made) withdrawing plunger 354 permitting spring 356 to force latch 352 over connection 105 preventing roller 104 from following cam 102. Solenoid 350 is deactivated when a full complement of cigars is in the feed (i.e., micro-switch 48 open) permitting plunger 354 to be forced outwardly by spring 358 removing latch 352 from path of connection 105 over the biasing of spring 356, thus controlling the operation of the machine. It will be noted that all of the fingers must be raised by the cigars and that any void between cigars or an insufficiency of the requisite number will prevent the feed of cartons. In the present embodiment 9 fingers are employed, these 9 being effective to sense at least 10 fingers. It will also be noted that the position of the sensing means N is sufficiently to the rear of the gate 320 to insure that the machine will have sufficient cigars to fill cartons which had already been dropped from the hopper H, which is at least two index positions ahead of the cigar loading position.

Upon release of gate 320, a charge of cigars T are pushed into the loading position L (FIGS. 1, 4, 5, and 11) which is adjustably formed to accept only the exact number of cigars needed to fill the carton C at the receiving position. The loading position is a two-level operational unit comprising a charge supporting plate 360 which reciprocates at right angles to the path of movement of the cigars into the loading position and a lower level table 362. After the proper charge has been transferred to the plate 360, it withdraws to release the charge downwardly onto the transverse table chamber 362 which is in exact alignment with the funnel 224 leading to carton C at the receiving position. A vertically reciprocating depressor 364 (FIG. 11) rising above the level of the cigars on reciprocating table 360, is used to press the cigars slowly into the proper position within chute 362. The cigars are then pushed by a transversely reciprocating plunger 366 from the loading position into the carton C.

The transversely reciprocating plate 360, mounted on guide rod 370, and the plunger 366 mounted on rolling bracket 372 beneath plate 360, are joined by a spring 371 for conjoint forward movement. Bracket 372 is reciprocated on bar 374 by connection with cam 376 on the driven cam shaft 40 (previously described). The bracket 372, with its forward movement, fully advances the plunger 366 into the mouth of carton C at receiving position R. The plunger 366 carries with it, because of spring 371, the plate 360 to a stop 378 on rod 370, just below the charge loading position L. With its rearward movement, the plunger 366 retracts from the funnel 224 and as it does, its rear edge 373 engages depending boss 375 which pushes with it the plate 360. This conjoint movement of both plate 360 and plunger 366 permits the pushing of one charge of cigars into a carton while substantially simultaneously loading a succeeding charge on to the loading position L.

Bracket 372 is driven by cam 376 through connection with telescoping sleeve 380 and rod 382 biased together by spring 384, arms 386 and 388, link 390 and bell crank 392 pivoted at 394, having a roller cam follower 396. Arms 386 and 388 are suitably journalled on rotatable shaft 398 and a spring 400 biases follower 396.

The telescoping sleeve 380 and rod 382 arrangement is employed to provide a safety switch means capable of shutting the machine by disengagement of clutch 79 should the cigars for any reason be hindered in their entry rate at the receiving carton C. Mounted on sleeve 380 is a trigger 402 engaging the contact 404 of a micro-switch 406. In normal operation, as the spring 384 biases the sleeve 380 and rod 382 together, the trigger 402 engages contacts 404 making micro-switch 406, however, should the outer sleeve be arrested in its travel by the faulty movement of the cigar charge or the plunger 366 or for any other reason, the inner rod will move outwardly of sleeve 380 opening the switch 406. Upon opening of the switch 406 current is removed from the magnetic clutch 79. Micro-switch 406 will not make again until the hinderance is removed or the plunger 366 is reset.

The depressor 364 (FIG. 11) comprises a pivoting cigar engaging plate 410 hinged 416 to a spaced substantial parallel plate 142 mounted at the lower end of a vertical rod 414. The hinge connection 416 has one leaf 418 fastened substantially in the middle of plate 410 and one leaf 420 fastened to the plate 412 so that in response to its downward movement the cigar engaging plate 410 can incline and assume the angle of the cigars T as they swing downwardly off the supporting plate 360. By this means, the cigars T in the charge at the loading position cannot turn or rotate out of proper position. The cigar engaging plate 410 is also formed with a pair of curved cigar stop plates 422 at its rearward edge which engage (FIGS. 1 and 2) the front face of the forward cigar at the end of the infeed Table I even before the gate 320 may have a chance to close of its own weight.

The depressor 364 is reciprocated by cam 424 journalled on driven shaft 40 (previously described) by connection with arm 426 parallel movement mechanism and cam roller 430. Arm 426 is removably secured in sleeve 432 to parallel mechanism 428 in order that it and the entire depressor mechanism 364 may be removed to give access to the loading position L. The parallel moving mechanism is of conventional construction comprising a pair of upper and a pair of lower substantially horizontal arms 434 and 436, respectively, which are pivotally mounted to frame members and a pair of vertical tie bars 438. Cam follower 430 is pressed onto cam 424 by action of spring 440 on lower horizontal bars 436.

Sensing means 442 comprising a spring biased arm 444 extending into the forward end of the loading position is provided to determine the presence therein of a full charge of cigars. Sensing arm 444 is connected by arm 446 to microswitch 448 which is made when a full charge causes the arm 444 to rotate. Arm 444 is biased by spring 450 to prevent its rotation unless a full charge of cigars is pushed into the loading position. Unless microswitch 448 is made at the proper time, the carton conveyor E will stop and the charge pusher 366 and depressor 364 will not operate. This is, of course, to prevent the loading of less than a full charge of cigars.

At the present time, it can be observed that the elements forming the supporting plate 360, depressor 364, plunger 366, and the charging chute 362, are formed so as to be adjustable in width, depth and length, so that various sizes and shapes of cigars may be accommodated and that the number of cigars in each charge may be varied if desired. The various means of adjustment are all generally conventional and their description seems unnecessary here.

After the carton C is loaded with a charge of cigars, the conveyor E is indexed forward to carry the carton through the folding and sealing positions F and the ejecting position J. In its travel from the receiving position R, the carton C passes by a series of flap folding means shown in detail in FIGS. 13-22, as well as in FIGS. 1 and 6, in connection with which mention was previously made.

As will be seen in FIGS. 13, 15, 17, 20 and 22, the previously mentioned guide piece 232 changes shape so as to direct the top flap $c1$ and tongue $c2$ into the carton. From the gently curved section shown previously in FIG. 5 and now seen in FIG. 15, the guide 232 fans inwardly toward the conveyor and upwardly over the edge of the tongue $c1$ (FIG. 16) until it reaches the form shown in FIG. 20, i.e., having a roof portion 460. By this time, the cooperative vertical depending guide 228 (FIG. 15) has tapered to an end, being replaced by a right angle lifter guide 462 engaging the lower surface of the flap $c1$. From this point on, both the guide 232 and lifter 462 converge inwardly toward conveyor E (FIG. 21) scoring the leading edge of the tongue $c1$ into the carton as shown clearly in FIG. 17. When the carton reaches the end of the conveyor travel, the guides 232 and 462 asusme a substantially true vertical position, thus completely tucking the tongue $c2$ into the carton. The entire operation is accomplished only by the action imparted by guide 232 on the flap $c1$ and tongue $c2$, respectively, by the cooperative positioning of guide rails 228, 230, 232, and 462. No moving mechanisms are required nor is the carton stopped to perform this operation. It will also be observed that the guide rails 232 et al. are mounted to the frame of the machine by adjustable brackets 464 in a suitable, although conventional manner, so that they may be moved to accommodate cartons of larger or smaller sizes.

Reference is made to the details of FIGS. 13, 17, and 19 for the folding of the bottom flaps $c3$ and $c4$. After leaving the funnel 224, the bottom flaps $c3$ and $c4$ are folded by the action of a second plow 466 comprising an upper curved member 468, a flat separator plate 470 and a lower curved member 472. Unlike previously mentioned plow 220, the plow 466 engages the flaps $c3$ and $c4$ within its inner faces, causing the lower bottom flap $c4$ to fold flat against the cigar bottoms within the carton and the upper bottom flap $c3$ to fold to a horizontal position on separator plate 472. As the carton C is moved forward on the conveyor, the upper bottom flap $c3$ is carried from separator plate 472 to a glue wheel 474 where glue is applied to its under surface. From the glue wheel 474, the flap $c3$ is carried beneath still another curved guide plate 476 which then folds the flap $c3$ downwardly (FIG. 19). Guide plate 476 ends in a vertical section 478 which causes the glued surface of flap $c3$ to adhere to the surface of the now underlying flap $c4$. Again, it should be noticed that the folding and sealing of the bottom flaps are a continuous process requiring no moving mechanism (except the glue wheel) and no stopping of the machine. All of guides 468, 470, 472, 476 and 478 are adjustably mounted for the reasons previously mentioned.

The glue wheel 474 is mounted (FIG. 6) on shaft 480 located in bearing block 482 and rotates within a glue pot 484 mounted to the frame. The glue wheel is rotated by connection to shaft 302 (previously described) through gears 486 and 488, sprocket 490, chain 492 and sprockets 494 and 496, chain 498 and sprocket 500 journalled on shaft 302. Sprocket 488 and gear 490 are journalled on shaft 502 and gear 486 is journalled on wheel shaft 480. Sprockets 494 and 496 are freely rotated about shaft 90, being journalled on a sleeve 504 suitably mounted for this purpose on shaft 90. Since the gluepot is driven from shaft 302 via sleeve 504, rather than shaft 90, it is continuously driven even though the magnetic clutch 79 is de-energized. A tension wheel 510 is provided (FIG. 7) to tension chain 492. A scraper blade 508 is adjustably mounted on the gluepot 484 so that a uniform film of glue can be transferred to the flap $c3$ while at the same time keeping the glue wheel 474 clean.

The now fully sealed carton C is carried by conveyor E over the sprocket 202 and downwardly into a vertical position at the ejection position J. (FIGS. 7, 9, 10.) At this point the bottom flap $c4$ of the carton comes into contact with a resistance heater 520 so as to heat-set the glue. From this vertical position, the carton is pushed by a pair of ejecting arms 522 to a delivery table 524 where they are moved for some distance in order to set the glue and accumulated for further handling, cellophane wrapping or boxing.

The ejector arms are mounted on a movable bracket 550 located on slideway 552 and are operated in a timed reciprocating movement by cam 526 journalled on main cam shaft 40 (FIGS. 7-10) through interconnecting shaft 528, bracket 530, arms 531 and 532, rod 534, right angled bevel gears 536, rod 538, arms 540, and 542, and a bell crank 544 pivoted at 546 and having cam follower 548. The transverse of bell crank 544 causes an oscillating movement in arms 540 and 542 which is transmitted as a rocking movement to the bevel gears 536. The rocking of bevel gears 536 is then transmitted as a reciprocatory movement to arms 522. Arms 522 are mounted on a sliding bracket 550 located on a slideway 552.

The delivery table is lined on either side of its entire length by a pair of adjustably movable walls 560 and 562. Along the initial part of one wall (562) there is provided an adjustable pressure mechanism 564, comprising an endless impregnated canvas belt 566 stretched over a plurality of spring loaded rolls 568. As part of the wall structure of the delivery table, the flxible belt exerts a substantial pressure on the ends of the cartons as they are moved along the table. Because of this, the glued flaps are firmly set and smearing of the glue is minimized since the cartons do not rub against the wall until the glue is dry.

By reference to FIG. 24 which is a pictorial diagram of the operating control of the machine, there will be readily observed the interlocking arrangements insuring the delivery of cigars and cartons in their proper timed relationship. The diagram depicts the operation of the machine under relative optimum conditions, i.e., a full load of cartons and cigars properly forwarded and opened.

By following the diagram, it will be observed that line current is derived from terminals 500 and 502 to provide power to actuate the controls and the machine. Toggle switches 504, push button 506 and holding relay 508 are arranged to provide manual actuation of the electric clutch 79 and the control mechanism. The sensing means for sensing the opening of a carton, feeding of a carton, feeding a predetermined number of cigars, and the operation of the plunger are circuited together for interlocking action. The opening of the cartons is detected at the set up position S where switches 180 and 184 are located. Switch 180 is normally closed while switch 184 is normally open so that when a carton is properly opened a reversal of switch positions occurs. However, should a carton not seat properly, switch 184 will remain open while switch 180 will open due to the engagement of the carton with switch feeler 176 (previously mentioned in connection with a description of the set up position) thus opening the control circuit. The passage of an open carton is detected by switch 333 which is located across the carton set up switches 180 and 184. Switch 333 is normally closed and opens in the event an open carton passes it. The opening of switch 333 permits the charge group sensing switch 448, located at the loading position L in the machine, to take over the control of the circuit. Switch 448 is normally open and closes only when a predetermined number of cigars are received on the supporting plate 360. When this occurs, the circuit is closed, bypassing the then opened switch 333. The circuit also contains switch 406 mounted on the telescoping actuating rods 380 and 382 of the cigar plunger 366 (previously described.) The switch 406 is normally closed, however, upon undue resistance or drag on the cigar plunger, it opens preventing completion of the circuit and operation of the carton feed and cigar insertion mechanism.

A timing cam 508 is provided to control the operation of all the switches in the control circuit in timed sequence. The timing cam 510 is suitably mounted on the main cam drive shaft 40 (previously described) which, it will be noted, makes one revolution per cycle of operation. The timing cam operates timing switch 512 so that when a carton is introduced, it completes the circuit before switch 333 breaks the circuit. Just prior to the transfer of the cigars to the lower loading platform 362 the switch 333 breaks the circuit, but if the platform contains a full load of cigars, switch 448 will be actuated shorting open cam switch 512.

The detection of a full supply of cigars in the machine is made by switch 348 which is normally opened. On the absence of one or more cigars, fingers 340 (previously described) triggers the switch 348 closed, actuating the solenoid 350 to close the suction valve lever 105, which is shown open in the diagram. Timing cam 512 is also provided on the aforementioned cam drive shaft 40 to control the proper timing sequence of this switch. This cam closes switch 514 when the suction valve is shut off.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A cigar cartoning machine comprising means for receiving and forwarding a file of wrapped cigars, means for separating and grouping said cigars in predetermined numbers, means for supplying and opening collapsed cartons, means for inserting groups of cigars in the opened cartons and mechanism for detecting the absence of an open carton and in response thereof arresting the forwarding of cigars, without incapacitating the carton supply and opening means, said several means being disposed in juxtaposition to each other and coordinated to act in continuous progression only upon a continuing supply of cartons so as to deliver cigars to be filled by said cartons.

2. A cigar cartoning machine comprising means for receiving and forwarding a file of wrapped cigars, means for separating and grouping said cigars in predetermined numbers, means for supplying and opening collapsed cartons, means for inserting groups of cigars in the opened cartons and mechanism for detecting the absence of a sufficient number of cigars being forwarded and in response thereof for arresting the supply of cartons, without incapacitating the cigar forwarding and receiving means, said several means being disposed in juxtaposition to each other and coordinated to act in continuous progression only upon a continuing supply of cigars so as to deliver cartons to be filled by a group of cigars.

3. In a cigar cartoning machine of the type described including means for forwarding a file of cigars lying side-by-side for insertion in a carton supplied to a loading station, apparatus for detecting the presence of a continuous file of cigars of predetermined length and for controlling the supply of cartons, comprising switch means for controlling said carton supply, said switch means having a pivoted contact, a plurality of gravity biased fingers, the weight of any one of said fingers being sufficient to operate said pivoted contact, means mounting said fingers above said file for engagement with the cigars thereon, whereby the absence of a cigar beneath anyone of said finger will cause the weight of said finger to operate said contact.

4. In a cigar cartoning machine of the type described, apparatus for forwarding and accumulating a group of wrapped cigars lying side-by-side at a loading station for insertion in a carton supplied to the loading station, comprising, at least one pair of opposed endless conveyors, means for mounting said conveyors in adjustable spaced relations one with the other so as to carry said cigars in frictional engagement between them transversely of their direction of movement, means for continuously driving each of said conveyors at the same speed, hinged gate means located at the end of said conveyors for arresting the forward movement of said cigars, means for supplying an opened carton to said loading position and means operative by the passing of a carton to the loading position for opening said gate means thereby permitting the forward passage of a group of said cigars to said loading position.

5. In a cigar cartoning machine of the type described, apparatus for supplying and opening collapsed cartons for the insertion of cigars therein, comprising a hopper for the storage of a supply of collapsed cartons, means for removing the cartons one-by-one from said hopper to an erection station, means for progressively transferring each removed carton to a pocket of an indexing conveyor located at said erection station, baffle means located at said erection station for guiding said collapsed cartons into said pocket, fixed guide means for first seating one edge of said collapsed cartons in said pocket and means for thereafter depressing the opposite edge of said carton along said baffle means thereby simultaneously seating and opening the entire carton within said pocket during indexing of said conveyor.

6. The apparatus of claim 5 including means for preventing the removal of cartons from the hopper in the event an insufficient number of cigars are available for insertion in the cartons.

7. The apparatus of claim 5 including means for detecting the complete erection of a carton in the pocket and mechanism controlled by said detecting means for preventing the insertion of cigars in an incompletely erected carton.

8. In a cigar cartoning machine of the type described wherein charges of cigars are progressively forwarded and inserted in opened cartons indexing in a path juxtaposed to the path of movement of the cigars, apparatus for the substantially simultaneous receipt of a charge of cigars and the insertion of a preceding charge in an opened carton, comprising an upper table mounted for reciprocating movement in a direction toward and away from said carton, means for forwarding a charge of cigars to said upper table, a lower cigar supporting table, means for lowering said charge to said lower table as said upper table is moved in a direction away from said conveyor, a cigar plunger engaging the ends of said cigars on said lower table for insertion in said carton, means for reciprocating said plunger in a direction toward and away from said carton, said upper table being connected for substantially conjoint movement to said plunger whereby said upper table and said plunger move together to respectively receive and insert a charge of cigars.

9. The apparatus of claim 8 wherein the means for reciprocating said plunger includes mechanisms for preventing its operation in the event of a fault or error in the cigar charge.

10. The apparatus of claim 8 including means controlling and coordinating the indexing of the carton, the feeding of cigars and the reciprocation of the upper table and plunger to act in continuous timed progression upon a continuing supply of cigars and cartons respectively.

11. The apparatus of claim 8 including means for detecting the presence on the upper supporting table of a charge of cigars containing a predetermined number, and in the absence thereof to prevent indexing of the cartons and insertion of any cigars into the cartons.

12. The apparatus of claim 8 wherein the means for lowering the cigars from the upper reciprocating table to the lower table comprises a vertically reciprocating plunger having at its lower end a hinged flat plate adapted to rest upon the cigars, said plate being hinged to said plunger so that it inclines and assumes the angle of the cigars as the cigars are removed from said upper table.

References Cited by the Examiner
UNITED STATES PATENTS

| | | | |
|---|---|---|---|
| 1,868,583 | 7/32 | Ostrom | 53—60 |
| 1,952,042 | 3/34 | Ahnger | 53—60 |
| 1,964,640 | 6/34 | Malocsay | 53—55 |
| 2,053,435 | 9/36 | Kimball et al. | 53—56 |
| 2,095,938 | 10/37 | Schmitt | 53—56 |
| 2,224,716 | 12/40 | Anderson | 53—376 |
| 2,340,835 | 2/44 | Malhoit | 53—376 |
| 2,656,656 | 10/53 | Murdoch et al. | 53—61 |
| 2,934,869 | 5/60 | Engleson et al. | 53—67 X |
| 3,016,665 | 1/62 | Barrett | 53—73 |

FRANK E. BAILEY, *Primary Examiner.*

ROBERT A. LEIGHEY, TRAVIS S. McGEHEE,
*Examiners.*